United States Patent
Herrlich et al.

(10) Patent No.: US 9,447,279 B2
(45) Date of Patent: Sep. 20, 2016

(54) WAXY OXIDATION PRODUCTS OF RICE BRAN

(71) Applicants: Timo Herrlich, Buehl (DE); Stefanie Wolf, Worms (DE); Rainer Fell, Gersthofen (DE); Gerd Hohner, Augsburg (DE)

(72) Inventors: Timo Herrlich, Buehl (DE); Stefanie Wolf, Worms (DE); Rainer Fell, Gersthofen (DE); Gerd Hohner, Augsburg (DE)

(73) Assignee: Clariant International Ltd., Muttenz (CH)

( * ) Notice: Subject to any disclaimer, the term of this patent is extended or adjusted under 35 U.S.C. 154(b) by 0 days.

(21) Appl. No.: 14/436,624

(22) PCT Filed: Oct. 11, 2013

(86) PCT No.: PCT/EP2013/003062
§ 371 (c)(1),
(2) Date: Apr. 17, 2015

(87) PCT Pub. No.: WO2014/060082
PCT Pub. Date: Apr. 24, 2014

(65) Prior Publication Data
US 2015/0247039 A1   Sep. 3, 2015

(30) Foreign Application Priority Data

Oct. 20, 2012 (DE) .................. 10 2012 021 082

(51) Int. Cl.
*C08L 91/06* (2006.01)
*C11C 3/00* (2006.01)

(52) U.S. Cl.
CPC ............. *C08L 91/06* (2013.01); *C11C 3/006* (2013.01)

(58) Field of Classification Search
None
See application file for complete search history.

(56) References Cited

U.S. PATENT DOCUMENTS

| | | | |
|---|---|---|---|
| 2,703,807 A * | 3/1955 | Wilder | ............ C11B 11/00 554/1 |
| 4,083,731 A * | 4/1978 | Brotz | ............ C10G 73/38 106/10 |
| 6,316,650 B1 | 11/2001 | Heinrichs et al. | |
| 6,890,982 B2 * | 5/2005 | Borsinger | ......... C09J 123/0853 524/272 |

FOREIGN PATENT DOCUMENTS

| | | | |
|---|---|---|---|
| DE | 2450342 | | 12/1975 |
| DE | 2432215 | | 1/1976 |
| DE | 10231886 | * | 2/2004 ............ C09F 1/04 |
| EP | 1010728 | | 6/2000 |
| EP | 1343454 | | 9/2003 |
| JP | 2010020304 | | 1/2010 |
| WO | WO 0247619 | | 6/2002 |
| WO | WO 2014060081 A1 * | | 4/2014 ............ C08L 91/06 |

OTHER PUBLICATIONS

DE 10231886, Lutz, M. et al., Carnauba wax oxidates especially for ue in cosmetics are obtained by oxidation of the wax using chromosulfuric acid while at least partially decomposing the wax ester, 2004, English translation (13 pages).*

(Continued)

*Primary Examiner* — Yate K Cutliff
(74) *Attorney, Agent, or Firm* — Anthony A. Bisulca (57) ABSTRACT

The invention relates to waxy oxidation products of rice bran, which are characterized by an acid number measured according to DIN ISO 2114 of at least 70 mg KOH/g, preferably at least 100 mg KOH/g, most preferably at least 140 mg KOH/g, and their use for producing synthetic ester waxes by esterification with one or more mono- or polyvalent alcohols.

24 Claims, 5 Drawing Sheets

(56) References Cited

OTHER PUBLICATIONS

DE 2432215, Endroe Ludwig, et al., Fully snthetit ester wases for floor polishes-prepared by esterifying synthetic aliphatic carboxylic acids and synthetic alcohol, 1976, English Tranlation, 8 pages.*
PCT International Search Report for PCT/EP2013/003062, mailed Feb. 6, 2014.
International Preliminary Report on Patentability for PCT/EP2013/003062, mailed Apr. 21, 2014.
English Abstract for DE 10231886.
English Abstract for JP 2010020304.
English Abstract for DE 2432215.

* cited by examiner

Figure 1: Chain length distribution of rice bran wax Type 1.

Figure 2: Chain length distribution of rice bran wax Type 2.

Figure 3: Chain length distribution of rice bran wax Type 3.

Figure 4: Chain length distribution of rice bran wax Type 4.

Figure 5: Chain length distribution of oxidized rice bran wax Type 2 (experiment No. 2).

WAXY OXIDATION PRODUCTS OF RICE BRAN

The invention relates to highly oxidized waxy oxidation products of rice bran, in particular waxy oxidation products of rice bran with a high acid number, and to processes for producing them. It further relates to the use of such waxy oxidation products of rice bran for producing partially synthetic wax esters, partially saponified wax esters, and saponified acid waxes.

The oxidation of fossil and of non-fossil natural waxes with chromosulfuric acid has been known since the start of the 20$^{th}$ century and has been carried out industrially using fossil montan waxes since 1927 inter alia in the "Gersthofen process" that is still operated today. Besides the fossil montan wax, this chromic-acid-based process can also be used to oxidize renewable natural waxes such as e.g. carnauba wax, candelilla wax etc. A process for the oxidation of chromic acid of carnauba wax has been described for example in DE10231886. Unrefined carnauba waxes (greasy gray, type 4; mid-yellow, primary yellow and fluorescent, types 3 to 1) and in particular crude montan wax (black) are distinctly dark-colored. Oxidation with chromosulfuric acid leads to wax products which are considerably lighter ranging to white. Furthermore, the chromic acid bleaching of said natural waxes leads, depending on the amount of chromic acid used compared to the wax used, to high and defined acid numbers (typically: 130 to 160 mg KOH/g). Oxidation with chromic acid leads essentially to a cleavage of the wax ester and also to an in-situ oxidation of the resulting wax alcohols to wax acids. The extent of the acid number is a measure of the content of free wax acids. The typical conversions of said oxidations here are in the range from about 50 to 90% as regards the ester groups. The natural waxes bleached in this way therefore have, in addition to the desired lightening, a higher saponification number and acid number, which are associated with additional advantageous processing properties. The acid waxes obtained are exceptionally suitable for producing defined secondary products with a constant product quality therefrom e.g. by esterification with mono- or polyvalent alcohols such as, for example, methyl alcohol, ethyl alcohol, ethylene glycol, butylene glycol or glycerol or by saponification or partial esterification in combination with a partial saponification. By virtue of such modification processes, a multitude of so-called partially synthesized waxes which can be adapted in a targeted and optimal manner to the particular application requirements is accessible from naturally occurring wax raw materials. The adaptation potential by means of esterification, saponification etc. here is naturally all the greater, the higher the content of free acids established in the primary oxidation product. Corresponding production processes are described for example in Ullmann's Encyclopedia of Industrial Chemistry, 2000 Waxes, and also in Vladimir Vcelák, Chemie and Technologie des Montanwachses [Chemistry and technology of montan wax], 1959, part B: refining of montan wax, page 458ff.

The chromic acid oxidation of rice bran wax (hereinbelow: rice wax) proceeds, in contrast to the case of the aforementioned natural waxes, even in the case of a stoichiometric to superstoichiometric supply of chromic acid with only low conversions of the ester groups. Essentially, there is only a lightening of the rice wax.

The patent application JP-36005526 describes the production of solvent-containing polishing compositions in which a chemically modified wax based on rice wax is present. The modification takes place by oxidation of crude rice wax with chromium trioxide or chromic acid salts in the presence of sulfuric acid and optional subsequent esterification and/or saponification of the acid groups formed in the process. However, acid numbers up to at most 45 mg KOH/g are only achieved here.

Chemically modified rice waxes with acid numbers above 50 mg KOH/g have hitherto not been able to be produced e.g. by oxidation with chromosulfuric acid.

Rice wax is produced as a byproduct in the processing of paddy rice (oryza sativa). After the lemma attached to the grains have been removed during the threshing of ripe rice plants, and further husk constituents have been separated alongside other contaminants in the rice mill, the rice grains still contain the germ-bud and are surrounded by the so-called silverskin. Germ-bud and silverskin are removed in a further processing step by mechanical stripping and produce the rice bran alongside the stripped rice. Said rice bran comprises lipid fractions which consist primarily of fatty oils and to a lesser percentage of wax-like components. The latter are found in the oil obtained from the bran by pressing or solvent extraction, from which they can be isolated e.g. by freezing on account of their poor solubility at low temperatures. The calculated potential availability of rice wax, according to the Journal of Scientific & Industrial Research, 2005, Vol. 64, 866-882, were one to utilize the entire worldwide rice production in order to likewise obtain the rice wax besides rice oil, is about 300 000 tonnes per year.

According to Ullmann's Encyclopedia of Industrial Chemistry, 5$^{th}$ ed. 1996, Vol. A28, page 117, rice wax belongs to a group of waxes which has hitherto attracted only local importance or merely academic interest. The use of rice wax in cosmetics (EP-B1-1343454; see also Bräutigam, Lexikon der kosmetischen Rohstoffe [Lexicon of cosmetic raw materials], Norderstedt 2010, page 77), as processing auxiliary in plastics (JP-10007862; JP-60011553; JP-49090739; JP-60011553) as well as in printing inks and electrophotographic toners (JP-2010020304) has been described.

Despite numerous analytical investigations with incongruent findings, the chemical composition of rice wax is evidently not completely clarified. By contrast, the composition of the wax body from wax esters is certain. The rice bran wax esters consist primarily of monoesters of long-chain saturated unbranched fatty acids with long-chain unbranched aliphatic alcohols. Behenic and lignoceric acid with the chain lengths $C_{22}$ and $C_{24}$ are predominant in the acid fraction, and the chain lengths $C_{26}$, $C_{28}$, $C_{30}$, $C_{32}$ and $C_{34}$ are predominant in the alcohol fraction. In addition, the wax can comprise free fatty acids and also squalene, phosphorus lipids and steryl esters. The content of wax esters in refined and deoiled rice bran wax is usually greater than 96% by weight. In non-deoiled rice bran wax, the content of wax esters can also be only 50% by weight, depending on the content of the rice bran oil. Further variable constituents of the rice bran wax, that are to be regarded as minor constituents in terms of quantity, are the "dark substances", which are not specified in more detail, squalene, and also the so-called "gum" fraction. These lead in most cases to a product quality that fluctuates and is difficult to reproduce in terms of color and applicability. The current prior art for lightening the brown rice bran waxes is classical bleaching with hydrogen peroxide. Hydrogen-peroxide-bleached rice bran waxes are yellowish and correspond largely to the starting waxes in their ester content and in their acid number. Such types are supplied in the marketplace predominantly as deoiled and refined rice bran waxes, but likewise exhibit fluctuating product quality since the minor constituents remain in the product.

There is a continuing need for readily available and sustainable products with a high and in particular constant product quality. The rice bran wax as by product of the isolation of rice or rice oil does not arise as a competing product for food production and, on account of the higher added value, therefore constitutes a particularly sustainable renewable raw material. By virtue of an improved oxidation process with chromosulfuric acid and associated high acid numbers followed by a further chemical conversion (esterification, saponification, etc.), a reliable product quality can be achieved without the property fluctuations customary for natural waxes.

The object of the invention therefore consists in providing oxidation products of rice wax with defined properties and constantly high acid numbers as raw material for chemical derivatizations. This thereby provides the opportunity to satisfy the technical requirements of highly diverse application areas in an optimally adapted manner.

Contrary to the prior art hitherto, it has now surprisingly been found that an oxidation of the rice wax with chromosulfuric acid leads to high acid numbers, if the oxidation takes place in the presence of a suitable oxidation promoter (e.g. emulsifier, surfactant etc.) or with strong mechanical dispersion.

The invention provides waxy oxidation products of rice bran with an acid number measured according to DIN ISO 2114 of greater than 70 mg KOH/g, preferably greater than 100 mg KOH/g, particularly preferably greater than 140 mg KOH/g.

Figure 1:
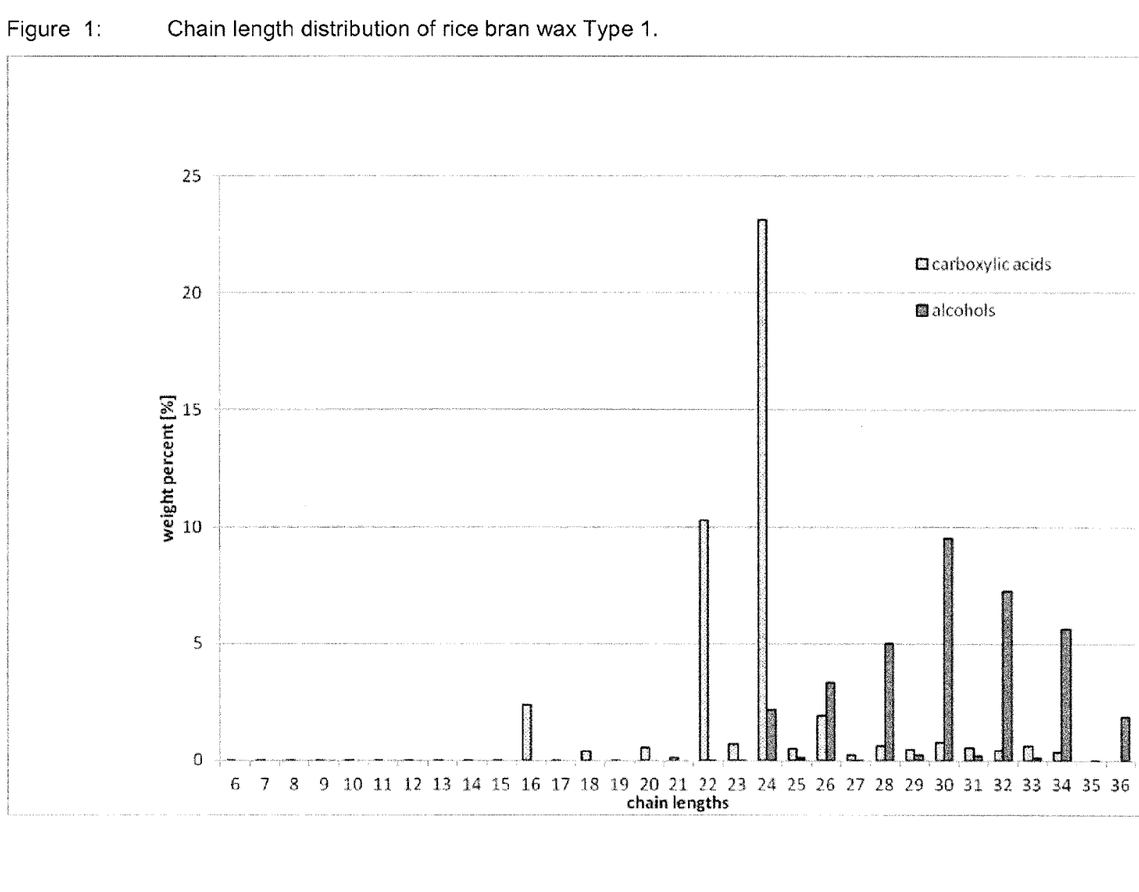
FIG. 1 is a graph showing the chain length distribution of rice bran wax Type 1.
Figure 2:
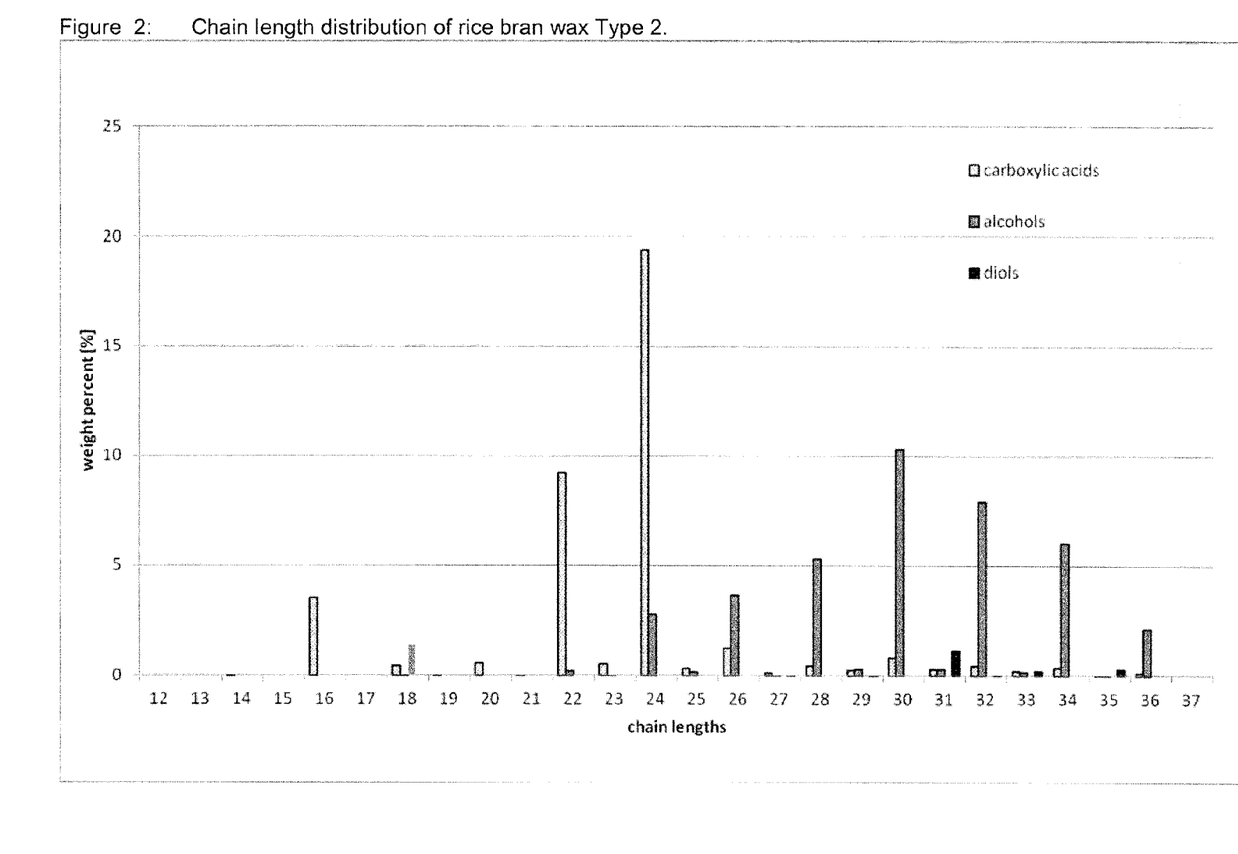
FIG. 2 is a graph showing the chain length distribution of rice bran wax Type 2.
Figure 3:
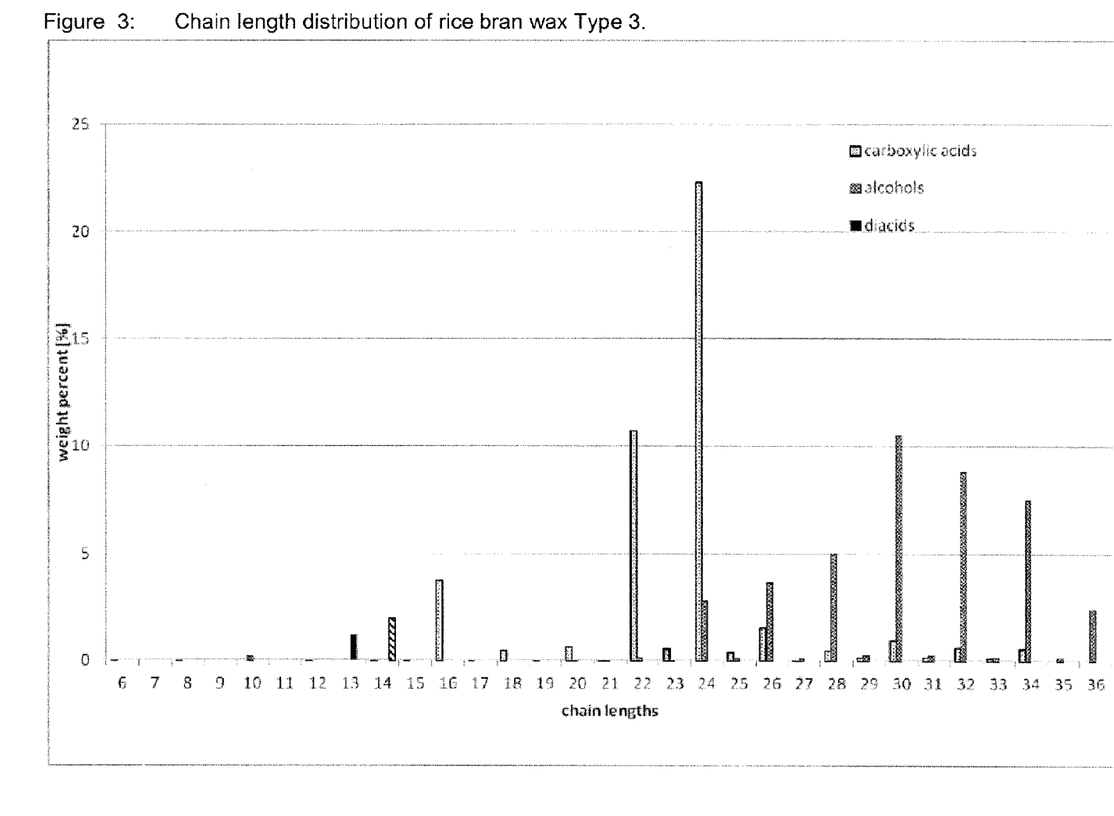
FIG. 3 is a graph showing the chain length distribution of rice bran wax Type 3.
Figure 4:
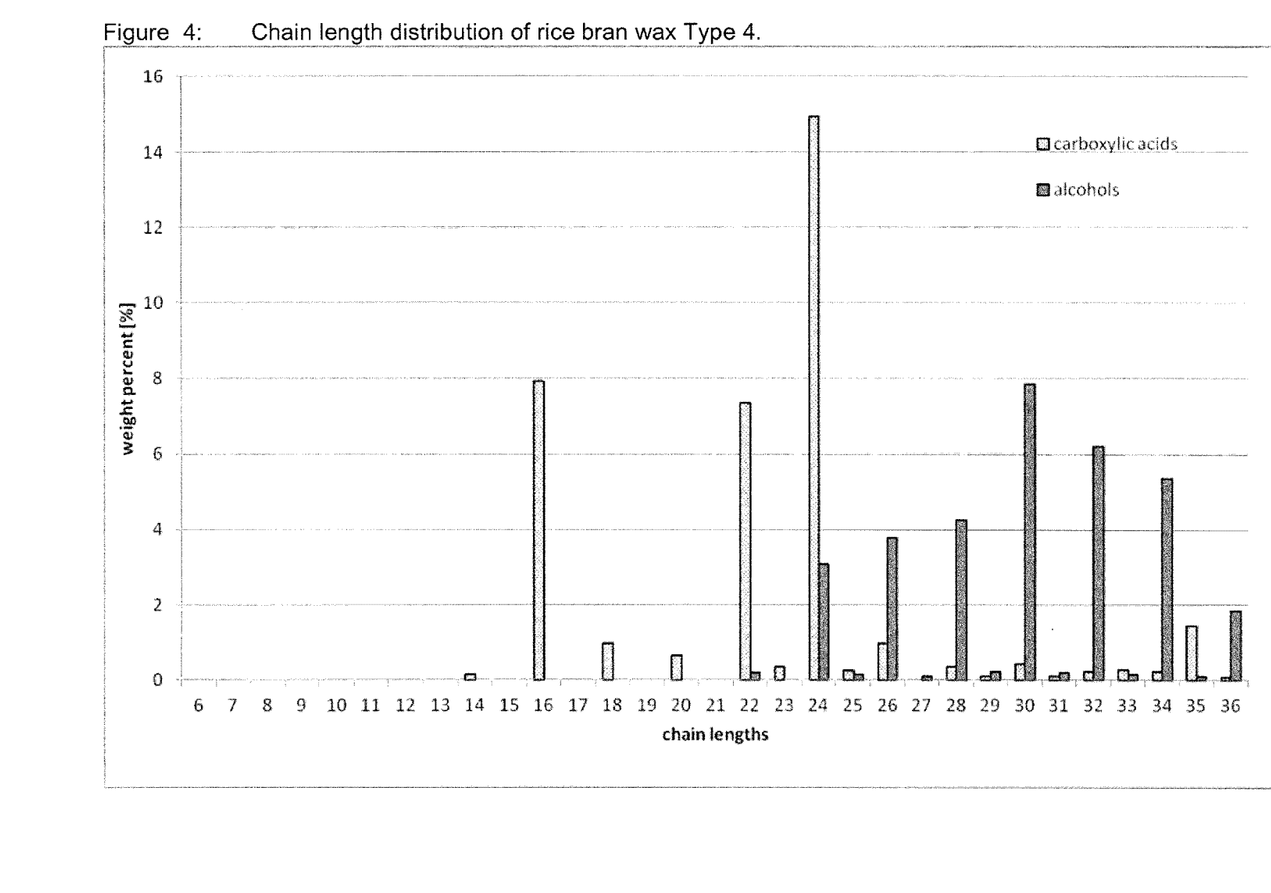
FIG. 4 is a graph showing the chain length distribution of rice bran wax Type 4.
Figure 5:
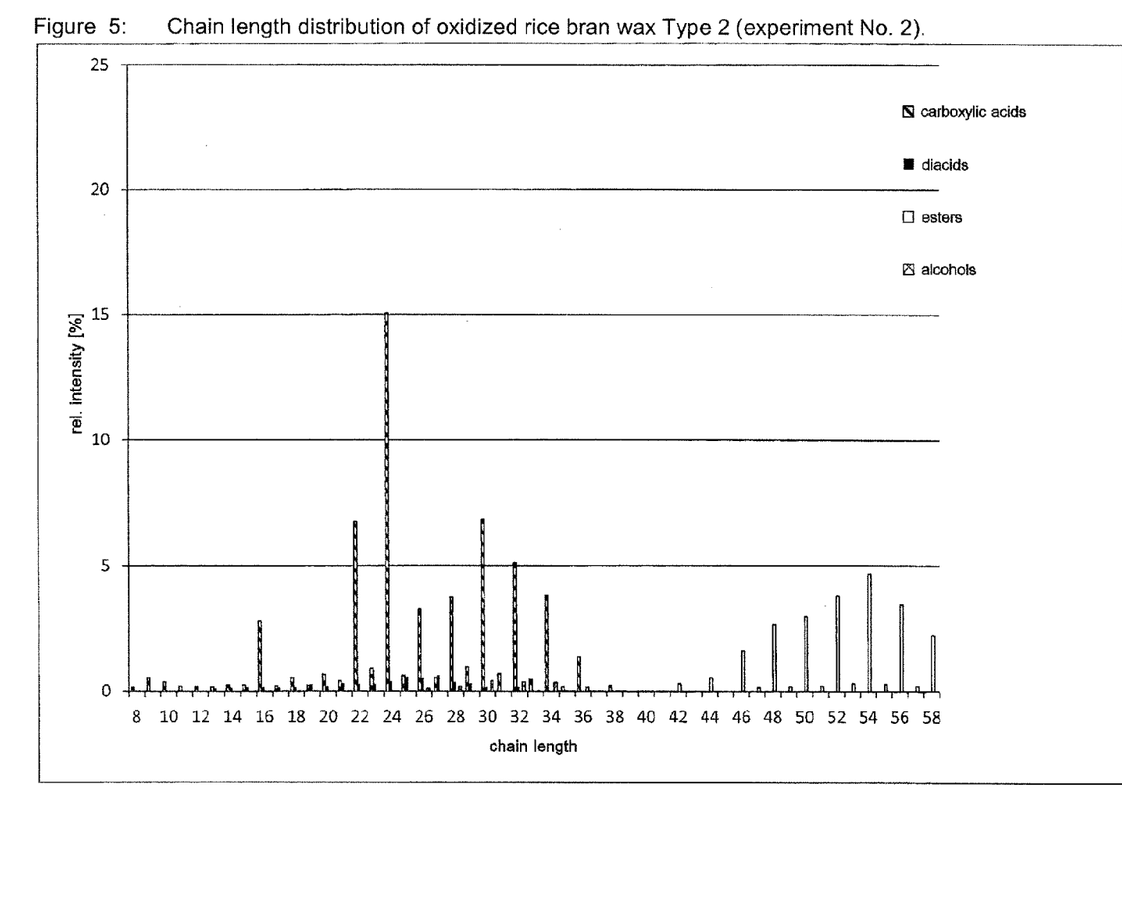
FIG. 5 is a graph showing the chain length distribution of rice bran wax Type 2 (experiment No. 2).

The waxy oxidation products of rice bran according to the invention comprise free aliphatic carboxylic acids $C_{16}$ to $C_{36}$ with a chain length distribution characteristic of waxy oxidation products of rice bran (see FIG. 5). This is characterized by a marked majority of lignoceric acid ($C_{24}$) and significant fractions of behenic acid ($C_{22}$) and melissic acid ($C_{30}$) in characteristic ratios. Preferably, the free carboxylic acid occurring most frequently therein, lignoceric acid ($C_{24}$ acid), is present to at least 10% by weight, preferably to at least 15% by weight, particularly preferably to at least 20% by weight. According to the invention, the characteristic weight ratio of behenic acid to lignoceric acid $C_{22}:C_{24}$ for the waxy oxidation products of rice bran is 1.0:2.0 to 1.0:2.8, preferably 1.0:2.1 to 1.0:2.4. The characteristic weight ratio of behenic acid to melissic acid $C_{22}:C_{30}$ for the waxy oxidation products of rice bran according to the invention is between 1.0:0.8 to 1:1.2, preferably between 1.0:0.8 to 1.0:1.05. The chain length distribution and the characteristic weight ratios were determined by means of GC.

Depending on the degree of conversion of the esters, the waxy oxidation products of rice bran according to the invention comprise genuine esters ($C_{46}$-$C_{62}$) in amounts of less than 65% by weight, preferably less than 50% by weight, particularly preferably less than 40% by weight. "Genuine esters" is understood here as meaning residual fractions of the wax esters originally present in the crude wax not included in the conversion. Furthermore, the waxy oxidation products of rice bran according to the invention comprise small amounts of aliphatic α,ω-dicarboxylic acids ($C_{10}$ to $C_{32}$), depending on the degree of conversion from 5 to 15% by weight. In addition, the waxy oxidation products of rice bran according to the invention can also comprise small amounts of aliphatic alkanols ($C_{24}$ to $C_{36}$).

Further constituents, which are not specified in more detail (e.g. phosphorus lipids, sterol derivatives, sterol esters, oryzanols, tocotrienols, glycolipids, squalene etc.) from the crude or refined rice bran wax raw material and also the oxidation products resulting therefrom can occur in low-quantity concentrations up to 12% by weight.

Depending on the amount of fatty oils (rice bran oil) present in the crude or refined rice wax raw material as a result of processing, fractions of short free fatty acids ($C_8$ to $C_{20}$) are also present. Preferably, the rice bran wax oxidation products according to the invention therefore also comprise the fraction of free fatty acids originating from oil ($C_8$ to $C_{20}$) up to a maximum of 50% by weight, preferably up to a maximum of 30% by weight, particularly preferably up to a maximum of 5% by weight.

According to the invention, the waxy oxidation products of rice bran comprise at least to 85% by weight
 a) 40 to 97% by weight of free aliphatic carboxylic acids $C_8$-$C_{36}$ (originating from wax, oil and/or fat),
 b) 0 to 50% by weight of free aliphatic alcohols $C_{24}$-$C_{36}$ (originating from wax),
 c) 3 to 15% by weight of free aliphatic diacids $C_{10}$-$C_{30}$ (originating from wax),
 d) 0 to 65% by weight of genuine esters $C_{44}$-$C_{62}$ (originating from wax),
 e) 0 to 12% by weight of further natural constituents present in the rice wax.

According to the invention, the waxy oxidation products of rice bran comprise at least to 85% by weight
 a) 60 to 97% by weight of free aliphatic carboxylic acids $C_8$-$C_{36}$ (originating from wax and oil and/or fat),
 b) 0 to 20% by weight of free aliphatic alcohols $C_{24}$-$C_{36}$ (originating from wax),
 c) 5 to 15% by weight of free aliphatic diacids $C_{10}$-$C_{30}$ (originating from wax),
 d) 0 to 50% by weight of genuine esters $C_{44}$-$C_{62}$ (originating from wax),
 e) 0 to 12% by weight of further natural constituents present in the rice wax.

According to the invention, the waxy oxidation products of rice bran particularly preferably comprise at least to 85% by weight
 a) 70 to 97% by weight of free aliphatic carboxylic acids $C_8$-$C_{36}$ (originating from wax and oil and/or fat),
 b) 0 to 5% by weight of free aliphatic alcohols $C_{24}$-$C_{36}$ (originating from wax),
 c) 5 to 12% by weight of free aliphatic diacids $C_{10}$-$C_{30}$ (originating from wax),
 d) 0 to 40% by weight of genuine esters $C_{44}$-$C_{62}$ (originating from wax),
 e) 0 to 12% by weight of further natural constituents present in the rice wax.

The waxy oxidation products of rice bran according to the invention are characterized by a dropping point measured according to DIN ISO 2176 between 70° C. and 90° C., preferably between 75° C. and 85° C.

Preferably, the waxy oxidation products of rice bran according to the invention are characterized, compared to conventional oxidation products (e.g. based on montan wax), by a particularly light to white color. The color can be quantified by reference to the iodine color number measured according to DIN 6162 and in the case of the waxy oxidation products of rice bran according to the invention is less than 20, preferably less than 10, particularly preferably less than 5.

According to the invention, the oxidation of the rice bran wax raw material increases the saponification number measured according to DIN ISO 3681 by at least 50%, preferably by at least 80%, particularly preferably by at least 150%. The increase in the saponification number can be explained mechanistically by the cleavage of the wax esters and the subsequent oxidation of the wax alcohols to give acids. Additionally, some of the unsaturated carbon-carbon bonds are cleaved by the chromic acid and likewise oxidized to acids. Consequently, the saponification number is also a measure of the oxidation that has actually taken place in delimitation from the saponification, during which, as is known, the saponification number does not change, and in delimitation from the other bleaching processes which merely lead to a lightening of the product. For example, the bleaching of rice bran wax with hydrogen peroxide does not bring about any chemical modification of the wax for the purposes of the invention since here only colored contaminants and secondary constituents are eliminated without the actual wax structure being changed.

The waxy oxidation products of rice bran according to the invention are carried out in one stage by oxidation with chromosulfuric acid with simultaneous addition of an oxidation promoter. The oxidation promoter is used to an extent of not more than 10% by weight, based on the starting wax used, preferably to an extent of not more than 5% by weight, more preferably to an extent of not more than 1% by weight. Oxidation promoters are understood here to mean substances which, by their chemical nature, stimulate or accelerate oxidation through phase mediation, ester activation, or by catalysis. Oxidation promoters used are, for example, acid-stable and, for better removability, water-soluble emulsifiers (for example alkanesulfonates, perfluorinated alkanesulfonic acids, nonafluoro-1-butanesulfonic acid, etc.), surfactants, polymeric surfactants, nitrogen-containing cationic surfactants, phase transfer catalysts, Fenton reagents (e.g. $FeSO_4+H_2O_2$), and also metal salts (for example $AlCl_3$, $FeCl_3$, $CuCl_2$, $CoCl_2$) or hydrochloric acid. Further emulsion mediators suitable for this embodiment for preparation of waxy oxidation products of rice bran can be found, for instance, in Ullmann's Encyclopedia of Industrial Chemistry, 2000, Emulsions. In a supporting manner, the interface of the reaction in this embodiment can be increased by strong mechanical dispersion. In the borderline case of sufficiently high mechanical dispersing action, it may be possible to dispense with an oxidation promoter. Preference is therefore given, for the preparation of the waxy oxidation products of rice bran according to the invention, to oxidation with chromosulfuric acid with strong mechanical dispersion (e.g. ultrasound, dissolver disk at very high speed, etc.).

With the two embodiments mentioned, rice bran wax can be oxidized to acid numbers of at least 70 mg KOH/g, preferably at least 100 mg KOH/g, particularly preferably at least 140 mg KOH/g. Similarly, this is moreover also possible with other poorly oxidizable natural waxes, such as e.g. sunflower wax etc.

According to the invention, further substances oxidizable with chromic acid (such as e.g. other waxes such as for example montan wax, carnauba wax, sugar cane wax or sunflower wax, also esters, diesters, organic acids such as, for example, stearic acid and behenic acid, fatty alcohols or aldehydes) can be used in minor amounts up to at most 20% by weight.

Preferably, the waxy oxidation products of rice bran according to the invention are freed from chromium salts after chromic acid oxidation has taken place irrespective of the production variant optionally by washing or centrifugation. The purity of the waxy oxidation products of rice bran according to the invention preferably satisfies the German Pharmacopeia for Cera montanglycoli.

The rice wax starting material used for producing waxy oxidation products of rice bran in the context according to the invention can be wax-like constituents obtained from rice bran by any desired separation processes. Preference is given here to the wax fractions isolated from rice bran oil in a known manner, e.g. by freezing or extraction. These can be used as such and/or following mechanical and/or physical purification and/or after bleaching by means of hydrogen peroxide. Preferably, the waxy oxidation products of rice bran according to the invention are produced by chromic acid oxidation according to processes described above if desired from crude, unrefined or refined rice bran wax. According to the invention, the rice bran wax comprises traces to significant amounts of rice bran oil of at most 50% by weight, preferably at most 30% by weight, particularly preferably at most 5% by weight.

The invention further provides the use of the waxy oxidation products of rice bran according to the invention for producing synthetic ester waxes by esterification with mono- or polyvalent alcohols (such as e.g. methyl alcohol, ethyl alcohol, ethylene glycol, butylene glycol, glycerol, diglycerol, trimethylolpropane, pentaerythritol, sorbitol, etc.). Typical instructions for preparation are described for example in Vladimir Vcelák, Chemie and Technologie des Montanwachses [Chemistry and technology of montan wax], 1959, part B: Refining of montan wax, pages 510-516 by way of example of relevant known montan wax esters of the type E, type O and of the type KPS, as well as in DE-2432215. If desired, further aliphatic or aromatic mono- and/or dicarboxylic acids can be added to the waxy oxidation products of rice bran before and/or during the esterification. Preferably, the esterification products are characterized, apart from being based on renewable raw materials, by a particularly light color, measured as iodine color number according to DIN 6162 of less than 10, particularly preferably less than 5.

The invention further provides the use of the waxy oxidation products of rice bran according to the invention for producing completely saponified rice bran wax derivatives by means of virtually equimolar saponification of basic metal hydroxides (e.g. NaOH (s), KOH (s), $Ca(OH)_2$ and $Zn(OH)_2$ (s), etc.), metal oxides (e.g. CaO, etc.), metal carbonates ($Na_2CO_3$, $CaCO_3$) or with aqueous alkaline solutions (such as e.g. NaOH (aq.), KOH (aq.), etc.). Corresponding preparation instructions can be found by way of example in DE-4019167. Preferably, besides being based on renewable raw materials, the esterification products are characterized by a particularly lighter color compared to the analogous montan wax soaps, measured as iodine color number according to DIN 6162 of less than 20, particularly preferably less than 10.

The invention further provides the use of the waxy oxidation products of rice bran according to the invention for producing partially saponified rice bran esters by partial esterification with polyvalent alcohols (such as e.g. ethylene glycol, butylene glycol, glycerol, diglycerol, trimethylolpropane, pentaerythritol, sorbitol, etc.) and subsequent saponification of the free acids with basic metal hydroxides (e.g. NaOH (s), KOH (s), Ca(OH)$_2$ and Zn(OH)$_2$ (s), etc.), metal oxides (e.g. CaO, etc.), metal carbonates (Na$_2$CO$_3$, CaCO$_3$) or with aqueous alkaline solutions (such as e.g. NaOH (aq.), KOH (aq.), etc.). Corresponding preparation instructions can be found by way of example in EP-1010728B1. If desired, further aliphatic or aromatic mono- and/or dicarboxylic acids can be added to the waxy oxidation products of rice bran before or during the partial esterification. Preferably, the partially saponified esterification products are characterized, apart from being based on renewable raw materials, by a particularly light color, measured as iodine color number according to DIN 6162 of less than 10, particularly preferably less than 5.

Both the waxy oxidation products of rice bran according to the invention and also the derivatives prepared therefrom as described by esterification, saponification, partial saponification etc. can be used industrially in diverse ways, e.g. as additives in plastics processing (internal and external lubricants, release agents, mold-release auxiliaries, dispersion auxiliaries for pigments), as constituent of care compositions (pastes, polishes, emulsions) or cosmetic preparations, as additives for printing inks, e.g. for scouring protection improvement, as additive for coatings for the purposes of matting or improving scratch resistance.

EXAMPLES

Hereinbelow, the preparation of waxy oxidation products of rice bran and also rice bran wax derivatives are described by way of example. The process takes place by oxidation of the rice bran waxes with chromosulfuric acid with the aid of a suitable oxidation promoter or with vigorous mechanical dispersion.

The rice bran wax derivatives are produced from the corresponding waxy oxidation products of rice bran.

Substance Characterization:

The standard methods listed below in table 1, which are used generally for characterizing fats and waxes, serve to determine the parameters of rice bran wax and rice bran wax derivatives.

TABLE 1

|  |  | Method |
|---|---|---|
| Acid number | [mg KOH/g] | ISO 2114 |
| Saponification number | [mg KOH/g] | ISO 3681 |

TABLE 1-continued

|  |  | Method |
|---|---|---|
| Dropping point | [° C.] | ISO 2176 |
| DSC melting point | [° C.] | DIN EN ISO 11357-1 |
| Melt enthalpy via DSC | [J/g] | DIN EN ISO 11357-1 |
| Oil content |  | AOCS Ja 4-46 |
| Mass loss via TGA | [wt. %, 300/+30 min] | DIN EN ISO 11358 |
| Iodine color number |  | DIN 6162 |

Chain Length Distributions:

The chain length distributions of the crude rice bran waxes (FIGS. 1-4) were determined by GF/UV separations. For this, the rice bran waxes were firstly saponified under defined conditions, the UV fraction (unsaponifiable) was extracted, the GF fraction (total fatty acids) was washed salt-free and both fractions were investigated separately by gas chromatography.

The comparison substances used were wax acids and wax alcohols with carbon chain lengths between C$_6$ and C$_{36}$. Wax esters with C$_{44}$ to C$_{58}$ were synthesized by combining the model substances.

In order to identify the peaks of the GCs of the rice bran waxes, in each case a defined amount of the individual components was added to a wax sample and a clear increase in the area of the corresponding peak was observed.

The chain length distributions of the oxidized rice bran waxes were likewise determined by means of gas chromatography. A preceding saponification is not necessary in this case since the majority of the esters are already present in cleaved form as a result of the reaction with chromosulfuric acid.

Table 2 shows the conditions under which the gas chromatograms of the rice bran waxes and rice bran wax derivatives were produced.

TABLE 2

| GC conditions. | |
|---|---|
| Column | Agilent Technologies HP-1 (DB-1) |
|  | Length 15 m I.D. 0.25 mm Film 0.10 μm |
| Detector | 310° C. FID |
| Injector | 300° C. Split 1:100 |
| Carrier gas | Helium |
| Solvent | Toluene |
| Concentration | 30 mg/ml |
| Injection amount | 1 μl |
| Temperature program | 40 to 320° C.; 5K/min; keep for 50 min at 320° C. |

The following waxes served as raw materials for the waxy oxidation products of rice bran and rice bran wax derivatives (rice wax type 1-4) or as comparison substances.

TABLE 3

| Raw materials and comparison substances used | | | | | | | | |
|---|---|---|---|---|---|---|---|---|
| Raw material | Acid number [mg KOH/g] | Saponification number [mg KOH/g] | Ester number [mg KOH/g] | Dropping point [° C.] | Melting point (DSC) [° C.] | Melt enthalpy (DSC) [J/g] | Oil content [%] | TGA (mass loss) [wt. %, 300° C./+30 min] | Iodine color number |
| Rice wax Type 1 (refined, deoiled) | 6.3 | 81.4 | 75.1 | 78 | 80 | −206 | 1.2 | 4.2/14.6 | 13.5 |
| Rice wax Type 2 (refined, deoiled) | 8.1 | 88.2 | 80.1 | 78 | 79 | −183 | 5 | 5.9/20.7 | 14 |
| Rice wax Type 3 (crude, deoiled) | 1.3 | n.d. | n.d. | n.d. | 79 | −192 | 1.5 | 1.2/6.4 | >120 |
| Rice wax Type 4 (crude) | 1.2 | 110 | 108.8 | 77 | n.d. | n.d. | 31 | 2.7/12.6 | >120 |

TABLE 3-continued

Raw materials and comparison substances used

| Raw material | Acid number [mg KOH/g] | Saponification number [mg KOH/g] | Ester number [mg KOH/g] | Dropping point [° C.] | Melting point (DSC) [° C.] | Melt enthalpy (DSC) [J/g] | Oil content [%] | TGA (mass loss) [wt. %, 300° C./+30 min] | Iodine color number |
|---|---|---|---|---|---|---|---|---|---|
| Deresinified crude montan wax | 28.0 | 80.9 | 52.9 | 86 | n.d. | n.d. | — | n.d. | |
| Oxidation product of deresinified crude montan wax prepared with chromic acid | 135 | 163 | 28 | 84 | n.d. | n.d. | — | n.d. | | n.d. = not determined

Example 1

Oxidation of Rice Bran Wax with Vigorous Stirring

Mixture:

| | |
|---|---|
| Rice bran wax (type 4) | 60 g |
| Chromosulfuric acid (100 g $CrO_3$/L) | 1060 ml |

Procedure:

A 2 l reaction vessel with stirrer, temperature sensor, dropping funnel and reflux condenser is initially charged with chromosulfuric acid and heated to 70° C. Subsequently, molten rice bran wax is added in portions. The temperature of the reaction mixture is adjusted to 110° C. and it is stirred with a dissolver disk at 2000 rpm for 10 h. The heating and stirring is stopped. As soon as the phases have separated, the aqueous phase is removed.

The organic phase is washed chromium-free with an aqueous solution of oxalic acid and sulfuric acid, and also water, discharged into warm centrifuge glasses and centrifuged.

Example 2

Oxidation of Rice Bran Wax using Oxidation Promoters

Mixture:

| | |
|---|---|
| Rice bran wax | 500 g |
| Chromosulfuric acid (100 g $CrO_3$/L) | 4960 ml |
| Oxidation promoter | 1% by weight based on rice bran wax |

Procedure:

A 5 l reaction vessel fitted with stirrer, temperature sensor, dropping funnel and reflux condenser is charged with chromosulfuric acid and the mixture is heated to 70° C. The rice bran wax is melted, mixed with the corresponding oxidation promoter and added in portions to the chromic acid. The reaction mixture is stirred at 110° C. for 12 h. The heating and stirring is adjusted. As soon as the phases have separated, the aqueous phase is separated off.

The organic phase is washed chromium-free with an aqueous solution of oxalic acid and sulfuric acid and also water, discharged into warm centrifuge glasses and centrifuged.

TABLE 4

Oxidation promoters used

| | Name | Empirical formula |
|---|---|---|
| Oxidation promoter type 1 | nonafluoro-1-butanesulfonic acid | $C_4HF_9SO_3$ |
| Oxidation promoter type 2 | heptadecafluoro-1-octanoic acid | $C_8HF_{17}SO_3$ |
| Oxidation promoter type 3 | aluminum trichloride | $AlCl_3$ |
| Oxidation promoter type 4 | hydrochloric acid, 35% | HCl |

It is clear from table 5 that a 1-stage synthesis of waxy oxidation products of rice bran having acid numbers greater than 100 mgKOH/g can be achieved with the aid of a suitable oxidation promoter. In addition, the conversion of the esters is increased by vigorous stirring with a dissolver disk.

TABLE 5

Oxidation of rice bran wax

| | | Experiment number | | | | | | | |
|---|---|---|---|---|---|---|---|---|---|
| | | 1 (acc. to the inv.) | 2 (acc. to the inv.) | 3 (acc. to the inv.) | 4 (acc. to the inv.) | 5 (acc. to the inv.) | 6 (acc. to the inv.) | 7 (comp.) | 8 (comp.) |
| Rice wax type 1 | [g] | | | | | 500 | | | |
| Rice wax type 2 | [g] | 60 | 500 | | | | 500 | | |
| Rice wax type 3 | [g] | | | | | | | 500 | 500 |
| Rice wax type 4 | [g] | | | | 500 | | | | |
| Deresinified crude montan wax | [g] | | | | | | | | 155 |

TABLE 5-continued

Oxidation of rice bran wax

| | | Experiment number | | | | | | | |
|---|---|---|---|---|---|---|---|---|---|
| | | 1 (acc. to the inv.) | 2 (acc. to the inv.) | 3 (acc. to the inv.) | 4 (acc. to the inv.) | 5 (acc. to the inv.) | 6 (acc. to the inv.) | 7 (comp.) | 8 (comp.) |
| Additions | | | | | | | | | |
| Chromosulfuric acid (100 g CrO$_3$/l) | [ml] | 1060 | 4960 | 4960 | 4960 | 4960 | 4960 | 2480 | 4960 |
| Oxidation promoter type 1 | [g] | | 5 | 5 | | | | | |
| Oxidation promoter type 2 | [g] | | | | | 5 | | | |
| Oxidation promoter type 3 | [g] | | | | | | 5 | | |
| Oxidation promoter type 4 | [g] | | | | | | | | 14.3 |
| Conditions | | | | | | | | | |
| Reaction time | [h] | 12 | 12 | 12 | 12 | 12 | 12 | 12 | 12 |
| Temperature | [° C.] | 110 | 110 | 110 | 110 | 110 | 110 | 110 | 110 |
| Stirrer power | [rpm] | 2000 | 600 | 600 | 600 | 600 | 600 | 600 | 600 |
| Test results | | | | | | | | | |
| Acid number | [mgKOH/g] | 72 | 102 | 121 | 172 | 115 | 93 | 135 | 32 |
| Saponification number | [mgKOH/g] | | 149 | | | | | 163 | |
| Dropping point | [° C.] | 75.8 | | | | | 74 | 84 | |
| Melting point | [° C.] | 77.1 | 74.6 | | | | | | |
| Melt enthalpy | [J/g] | −202.4 | −195 | | | | | | |
| Iodine color number | | | | | | 1.1 | | 0.9 | |

Examples 3-6

Ester Waxes and Partially Saponified Ester Waxes Based on Oxidized Rice Bran Wax Example 3

Synthetic Ester Wax (Type E)

Mixture:

| | |
|---|---|
| Oxidized rice bran wax (Type 1) | 500 g |
| Ethylene glycol | 34.1 g |
| Methanesulfonic acid | 1.1 g |

Procedure:

The waxy oxidation product of rice bran is melted under a nitrogen atmosphere in a 2 l reaction vessel fitted with stirrer, temperature sensor, dropping funnel and reflux condenser. Ethylene glycol and methanesulfonic acid are then added. The reaction mixture is stirred until an acid number of 16 mg KOH/g at 120° C. is reached.

Then, firstly NaOH is added and, after a further 5 minutes, hydrogen peroxide. Vacuum is applied for 10 minutes in order to withdraw water from the reaction mixture, and then the reaction mixture is pressure-filtered in the hot state.

Example 4

Synthetic Ester Wax (Type KSL)

Mixture:

| | |
|---|---|
| Oxidized rice bran wax (Type 1) | 250 g |
| Ethylene glycol | 15.4 g |
| Methanesulfonic acid | 0.55 g |

Procedure:

The waxy oxidation product of rice bran is melted under a nitrogen atmosphere in a 1 l reaction vessel fitted with stirrer, temperature sensor, dropping funnel and reflux condenser. Ethylene glycol and methanesulfonic acid are then added. The reaction mixture is stirred until an acid number of 30 mg KOH/g at 120° C. is reached.

Then, firstly NaOH is added and then, after 5 minutes, hydrogen peroxide. Vacuum is applied for 10 minutes in order to withdraw water from the reaction mixture, and then the reaction mixture is pressure-filtered in the hot state.

Example 5

Partially Saponified Ester Wax (Type OP)

Mixture:

| | |
|---|---|
| Oxidized rice bran wax (Type 1) | 500 g |
| Butanediol-1,3 | 30.6 g |
| Lime | 9.7 g |
| Methanesulfonic acid | 1.1 g |

Procedure:

The waxy oxidation product of rice bran is melted under a nitrogen atmosphere in a 2 l reaction vessel fitted with stirrer, temperature sensor, dropping funnel and reflux condenser. Butanediol and methanesulfonic acid are then added. The reaction mixture is stirred until an acid number of 50 mg KOH/g at 120° C. is reached. Then, firstly NaOH is added, then after 5 minutes hydrogen peroxide is added and, after a further 10 minutes, calcium hydroxide is added. The reaction mixture is stirred until the acid number reaches 14.

Vacuum is applied for 10 minutes in order to withdraw water from the reaction mixture and then the reaction mixture is pressure-filtered in the hot state.

Example 6

Synthetic Ester Wax (Methyl Ester)

Mixture:

| | |
|---|---|
| Oxidized rice bran wax (Type 1) | 500 g |
| Methanol | 2500 ml |
| Methanesulfonic acid | 5 g |

Procedure:

The waxy oxidation product of rice bran is melted under a nitrogen atmosphere in a 5 l reaction vessel fitted with stirrer, temperature sensor, dropping funnel and reflux condenser. Methanol and methanesulfonic acid are then added. The reaction mixture is stirred until an acid number of 8 mg KOH/g at 70° C. is reached. Then, the excess methanol is distilled off at 80° C., and then vacuum is applied for 20 minutes in order to completely remove the methanol.

Then, firstly NaOH is added and, after a further 5 minutes, hydrogen peroxide is added. Vacuum is applied for 10 minutes in order to withdraw water from the reaction mixture, and then the reaction mixture is pressure-filtered in the hot state.

TABLE 6

Ester waxes and partially saponified ester waxes based on oxidized rice bran wax

| | | Experiment number | | | |
|---|---|---|---|---|---|
| | | 9 (according to the invention) Type E | 10 (according to the invention) Type KSL | 11 (according to the invention) Type OP | 12 (according to the invention) Methyl ester |
| Oxidized rice wax Type 2 (experiment No. 5) | [g] | 500 | 250 | 500 | 500 |
| Additives | | | | | |
| Ethylene glycol | [g] | 34.1 | 15.4 | | |
| Butanediol | [g] | | | 30.6 | |
| Lime | [g] | | | 9.7 | |
| Methanol | [ml] | | | | 2500 |
| Methanesulfonic acid, 70% strength | [g] | 1.1 | 0.55 | 1.1 | 5 |
| Conditions | | | | | |
| Reaction time | [h] | 3 | 4 | 3 | 7 |
| Temperature | [° C.] | 120 | 120 | 120 | 70 |
| Test results | | | | | |
| Acid number | [mg KOH/g] | 18.2 | 31 | 14.2 | 8 |
| Saponification number | [mg KOH/g] | 185 | 114 | 147 | 173 |
| Dropping point | [° C.] | 76 | 83 | 108 | 64 |
| Melting point | [° C.] | 77.8 | 77.7 | | 60.1 |
| Melt enthalpy | [J/g] | 195.3 | −198 | | −169.5 |
| TGA | [wt. %, 300°/+30 min] | 9.8/24.8 | 10.5/25 | 3.8/14.3 | 94.8/97.5 |
| Iodine color number | | 4.6 | 7.4 | 19.6 | 8.3 |
| Ca content | [% by wt] | | | 1.23 | |

The invention claimed is:

1. A waxy oxidation product of rice bran, wherein the waxy oxidation product has an acid number measured according to DIN ISO 2114 of at least 70 mg KOH/g.

2. The waxy oxidation product of rice bran as claimed in claim 1, comprising at least 85% by weight the following components:
   a) 40 to 97% by weight of free aliphatic carboxylic acids $C_3$-$C_{36}$,
   b) 0 to 50% by weight of free aliphatic fatty alcohols $C_{24}$-$C_{36}$,
   c) 3 to 15% by weight of free aliphatic diacids $C_{10}$-$C_{30}$,
   d) 0 to 65% by weight of genuine esters $C_{44}$-$C_{62}$, and
   e) 0 to 12% by weight of further natural constituents present in the rice wax.

3. The waxy oxidation product of rice bran as claimed in claim 1, comprising at least 85% by weight the following components:
   a) 60 to 97% by weight of free aliphatic carboxylic acids $C_8$-$C_{36}$,
   b) 0 to 20% by weight of free aliphatic fatty alcohols $C_{24}$-$C_{36}$,
   c) 5 to 15% by weight of free aliphatic diacids $C_{10}$-$C_{30}$,
   d) 0 to 50% by weight of genuine esters $C_{44}$-$C_{62}$, and
   e) 0 to 12% by weight of further natural constituents present in the rice wax.

4. The waxy oxidation product of rice bran as claimed in claim 1, comprising at least 85% by weight the following components:
   a) 70 to 97% by weight of free aliphatic carboxylic acids $C_8$-$C_{36}$,
   b) 0 to 5% by weight of free aliphatic fatty alcohols $C_{24}$-$C_{36}$,
   c) 5 to 12% by weight of free aliphatic diacids $C_{10}$-$C_{30}$,
   d) 0 to 40% by weight of genuine esters $C_{44}$-$C_{62}$, and
   e) 0 to 12% by weight of further natural constituents present in the rice wax.

5. The waxy oxidation product of rice bran as claimed in claim 1, further comprising natural constituents in the rice wax from crude or refined rice bran wax raw material, and also optionally oxidation products arising therefrom in concentrations of not more than 15% by weight.

6. The waxy oxidation product of rice bran as claimed in claim 1, wherein the waxy oxidation product comprises lignoceric acid ($C_{24}$ acid) to at least 10% by weight.

7. The waxy oxidation product of rice bran as claimed in claim 1, wherein the weight ratios of lignoceric acid $C_{24}$, behenic acid $C_{22}$ and melissic acid $C_{30}$ form the following characteristic ratios:
   a) for the waxy oxidation products of rice bran according to the invention behenic acid to lignoceric acid $C_{22}:C_{24}$ is at 1.0:2.0 to 1:2.8,
   b) in the case of the waxy oxidation products of rice bran according to the invention, behenic acid to melissic acid $C_{22}:C_{30}$ is between 1.0:0.8 to 1:1.2.

8. The waxy oxidation product of rice bran according to claim 1, wherein a fraction of genuine esters ($C_{46}$-$C_{62}$) is in amounts less than 65% by weight.

9. The waxy oxidation product of rice bran according to claim 1, wherein it has a dropping point measured according to DIN ISO 2176 between 70° C. and 90° C.

10. The waxy oxidation product of rice bran as claimed in claim 1, wherein it has an iodine color number measured in accordance with DIN 6162 of less than 20.

11. A process for producing a waxy oxidation product of rice bran having an acid number measured according to DIN ISO 2114 of at least 70 mg KOH/g, by oxidation with chromosulfuric acid of crude or refined rice bran wax, with an increase in a saponification number and simultaneous use of small amounts of at most 10% by weight of one or more oxidation promoters, based on the amount of starting wax.

12. The process as claimed in claim 11, wherein the saponification number measured according to DIN ISO 3681 is increased by a minimum of 50%.

13. The process as claimed in claim 11, wherein, if desired, further substances oxidizable with chromosulfuric acid are added in minor amounts to a starting raw material.

14. The process as claimed in claim 11, wherein an end product is washed and optionally further processed.

15. The process as claimed in claim 11, wherein an end product is freed from any chromium soaps still present.

16. The process as claimed in claim 11, wherein a starting raw material comprises at most 50% by weight of rice bran oil.

17. A process for producing synthetic ester waxes by esterification of at least one waxy oxidation product of rice bran, wherein the at least one waxy oxidation product has an acid number measured according to DIN ISO 2114 of at least 70 mg KOH/g, with one or more mono- or polyvalent alcohols.

18. The process as claimed in claim 17, wherein further aliphatic or aromatic mono- or dicarboxylic acids are added to the at least one waxy oxidation product of rice bran prior to the esterification.

19. The process as claimed in claim 17, wherein the synthetic ester waxes have an iodine color number of less than 10.

20. The process as claimed in claim 17 for producing completely saponified rice bran wax derivatives by saponification with basic metal hydroxides, metal carbonates or with aqueous alkaline solutions.

21. The process as claimed in claim 17 for producing partially saponified rice bran wax esters by partial esterification with one or more polyvalent alcohols and subsequent saponification with basic metal hydroxides, metal carbonates or with aqueous alkaline solutions.

22. The process as claimed in claim 21, wherein further aliphatic or aromatic mono- or dicarboxylic acids are added to the waxy oxidation products of rice bran prior to the esterification.

23. The process as claimed in claim 21, wherein the esterification products have an iodine color number of less than 10.

24. A process for producing a waxy oxidation product having an acid number measured according to DIN ISO 2114 of at least 70 mg KOH/g, by oxidation with chromosulfuric acid of sunflower wax and sugar cane wax with an increase in the saponification number and simultaneous use of small amounts of at most 10% by weight of one or more oxidation promoters, based on the amount of starting wax.

* * * * *